UNITED STATES PATENT OFFICE 2,644,783

PARENTERAL AUREOMYCIN IN ANHYDROUS FORM

Joseph F. Weidenheimer, Pearl River, and Lawrence Ritter, Spring Valley, N. Y., assignors to American Cyanamid Company, New York, N. Y., a corporation of Maine No Drawing. Application September 8, 1949, Serial No. 114,695

6 Claims. (Cl. 167—65)

Our invention relates to a new therapeutic composition, more particularly to therapeutic agents comprising aureomycin as an acid salt in association with a material which modifies the pH of aqueous solutions thereof to a more suitable range for parenteral use. Aureomycin is a new drug produced by the fermentation of a nutrient liquor by the fungus *Streptomyces aureofaciens* as is more particularly described and set forth in the co-pending application of Benjamin M. Duggar, Serial Number 7,592 filed February 11, 1948, now Patent Number 2,482,055 dated September 13, 1949.

Aureomycin has been found to be a naphthacene derivative and while having a structure which strongly suggests tautomeric forms, is believed to exist with the following probable structure:

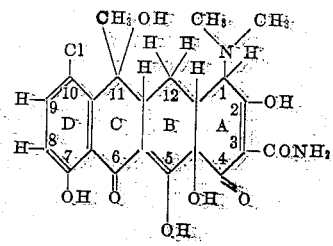

A numbering system is shown for the molecule. One proper name for the compound is 1-dimethylamino - 4,6 - dioxo - 10 - chloro - 11 - methyl - 2,4a,5,7,11 - pentahydroxy - 1,4,4a,6,11, 11a,12,12a - octahydronaphthacene - 3 - carboxamide. A generic term for the compound is chlorotetracycline, which is consistent with the name oxytetracycline for terramycin, as suggested in the Journal of the American Chemical Society, 74: 4976 (1952).

Aureomycin is an amphoteric material which can exist as the so-called free base or as the salt of an acid or base. Aureomycin is more stable at a lower pH and is most commonly used as an acid salt, usually the hydrochloride. In the past it has been found that the hydrochloride salt may be administered either orally or parenterally, but for parenteral use the high acidity of the aqueous solution is not usually desirable. Similarly, the free base and metallic salt are not sufficiently soluble and stable in aqueous solutions to be satisfactory for administration.

We have found that even though aureomycin is comparatively unstable at the pH ranges most desirable for parenteral administration, as a dry powder it is sufficiently stable in the presence of sufficient of an amino acid buffer, also as a dry material, to be salable as such. The mixture of the dry powders may be stored without refrigeration under normal conditions for a prolonged period. When water is added to it, the material dissolves, and the amino acid buffer serves to aid in forming a solution with a pH satisfactory for parenteral use which may be thereupon injected into a patient. This aqueous material is not stable over prolonged periods and is best used immediately after the addition of the water, it being preferred that it be injected within a period of less than 30 minutes. About ten percent inactivation occurs in 30 minutes at normal temperatures.

Aureomycin as the hydrochloride, when dissolved in water, normally is found to have a pH in the neighborhood of 2.5 to 3 at a concentration of around 10 milligrams per cc. The pH of solutions prepared from the dry mixtures of aureomycin as its hydrochloride and an amino acid buffer system including sodium glycinate, is in the neighborhood of 7 to 10, depending upon the choice of the amino acid, and other conditions. The alkali metal salts of other amino acids, such as asparagine, alanine, hydroxyproline, leucine, norleucine, etc. may also be used as the amino acid buffer. It is necessary that the amino acid be reasonably soluble and that its buffering action be near the desired range. Amino acids whose isoelectric point is between approximately 5.8 and 6.2 are satisfactory. The amino acids which are water soluble and whose alkali metal salts exhibit a buffer action from about 8.5 to about 10, are satisfactory as they form solutions with aureomycin in the permissible pH range for injection of from about 7 to 9.

It is of course possible to use preparations in which there are slight variations from the preferred values, and obtain satisfactory results. The aureomycin may be used as its hydrochloride or other hydrohalide salt, or other crystalline acid salt. The amino acid is preferably used as its sodium salt although it may be used as the potassium salt or other salt provided that the additional cations introduced are not deleterious. The sodium salt is usually the cheapest and the most readily obtained, and in the absence of unusual conditions will be found to be most satisfactory. Amino acids themselves are generally innocuous on parenteral injection, so that free amino acids may be present and make up part of the buffer system within solubility and pH limits.

For best results it is necessary that the materials remain dry because in the presence of water the pH is at an undesirably high level for best stability. In the absence of water the material is storage stable and may in fact be heat sterilized. The quantity of the amino acid to be added may vary over rather wide limits but excellent results are obtained when from 2 to 3 moles of the amino acid salt are present per mole of aureomycin hydrochloride.

Aureomycin hydrochloride is more soluble in the amino acid buffer system than it is in water. This enables the administration of a therapeutic dose in a smaller quantity of fluid, a further advantage of the invention.

The following examples illustrate but do not limit the range over which a therapeutically useful product may be obtained, but they do show examples of highly satisfactory therapeutic products.

Example 1

1 gram of recrystallized aureomycin hydrochloride was finely ground and screened, then mixed with 2.5 mole equivalents (454 milligrams) of dry powdered sodium glycinate, the commercial product being used. The powders were mixed and filled into vials which were heat sterilized and then capped. When the powders were constituted to a concentration of 50 milligrams of aureomycin hydrochloride per milliliter, a clear satisfactory solution was obtained having a pH of 8.3. The thus obtained solution is satisfactory for use by injection into the body. If allowed to stand for 30 minutes at room temperature as much as 10% of the aureomycin may be inactivated.

Example 2

1 gram of recrystallized aureomycin hydrochloride was ground, screened and mixed with 2 mole equivalents of sodium glycinate (364 milligrams). Upon solution in water to a concentration of 50 milligrams of aureomycin hydrochloride per milliliter, a clear solution was obtained with a pH between 7.8 and 7.9. The solution may reprecipitate on standing.

Example 3

1 gram of dry powdered aureomycin hydrochloride was mixed with 3 mole equivalents (546 milligrams) of sodium glycinate. The mixture was heat sterilized, then sealed in vials. For use, it was dissolved by the addition of 20 milliliters of sterile water, thereby yielding a clear solution suitable for parenteral use, having a pH of about 8.8.

Example 4

1 gram of dry aureomycin as the hydrochloride was finely ground and mixed with 1.2 grams of the sodium salt of asparagine. When reconstituted with water to a concentration of 4% aureomycin as the hydrochloride, there was obtained a clear solution with a pH of approximately 7.8. For human parenteral use it is normally desired that this solution be diluted two-fold to obtain 20 milligrams of aureomycin hydrochloride per milliliter of solution. The concentration of course may be varied in accordance with the desires of the practitioner in any particular case.

Example 5

1 gram of aureomycin hydrochloride was finely ground and mixed with 1.32 grams of the sodium salt of 1(-)-leucine and the mixture heat sterilized and sealed in vials. Upon use, 50 milliliters of water were added to provide a 2% solution of aureomycin computed as the hydrochloride which was clear and stable for short periods. The pH was approximately 8 although upon repetition it was found this varied between various lots.

As our invention we claim:

1. An aureomycin preparation in anhydrous form capable of yielding an intravenously administrable solution on solution in water comprising as a powder an unreacted mixture of aureomycin hydrochloride and about 2.5 mole equivalents of sodium glycinate.

2. An aureomycin preparation of improved characteristics comprising as a powder an anhydrous unreacted mixture of a non-toxic, intravenously acceptable acid salt of aureomycin and from 2 to 3 mole equivalents of an alkali metal salt of a soluble amino acid whose isoelectric point is between approximately 5.8 and 6.2.

3. An aureomycin preparation of improved characteristics comprising as a powder an anhydrous unreacted mixture of aureomycin hydrochloride and from 2 to 3 mole equivalents of sodium glycinate.

4. An aureomycin preparation of improved characteristics comprising as a powder an anhydrous unreacted mixture of aureomycin hydrochloride and from 2 to 3 mole equivalents of the sodium salt of leucine.

5. An aureomycin preparation of improved characteristics comprising as a powder an anhydrous unreacted mixture of aureomycin hydrochloride and from 2 to 3 mole equivalents of the sodium salt of asparagine.

6. A composition in anhydrous form capable of yielding an intravenously administrable aureomycin-containing solution on dilution with water comprising an intravenously acceptable acid salt of aureomycin and an alkali metal salt of a soluble amino acid whose isoelectric point is between approximately 5.8 and 6.2 in an amount sufficient so that the pH of the solution formed on dilution with water is between pH 7 and 9.

JOSEPH F. WEIDENHEIMER.
LAWRENCE RITTER.

References Cited in the file of this patent

UNITED STATES PATENTS

| Number | Name | Date |
| --- | --- | --- |
| 2,275,809 | Roberts | Mar. 10, 1942 |
| 2,343,625 | Abramson et al. | Mar. 7, 1944 |
| 2,482,055 | Duggar | Sept. 13, 1949 |
| 2,528,972 | Pillemer | Nov. 7, 1950 |

OTHER REFERENCES

Annals of Internal Medicine, December 1948, page 1078.

Journal American Medical Association, October 9, 1948, page 426.

Annals of the New York Academy of Sciences, November 30, 1948, pages 183 and 280.

Hydrogen Ions, Britton, 3rd edition, volume I (1943), page 311.

Surgery, Gynecology and Obstetrics, June 1951, page 670.

Journal of Pharmacy and Pharmacology, volume IV, number 12, December 1952, pages 1009 to 1036, especially at pages 1033 and 1034.